Aug. 1, 1967 C. G. O'NEILL 3,333,832
AIR VALVE CARBURETORS
Filed April 11, 1966 4 Sheets-Sheet 1

WITNESS:
Esther M. Stockton

INVENTOR.
Cormac G. O'Neill
BY
W S Thompson
ATTORNEY

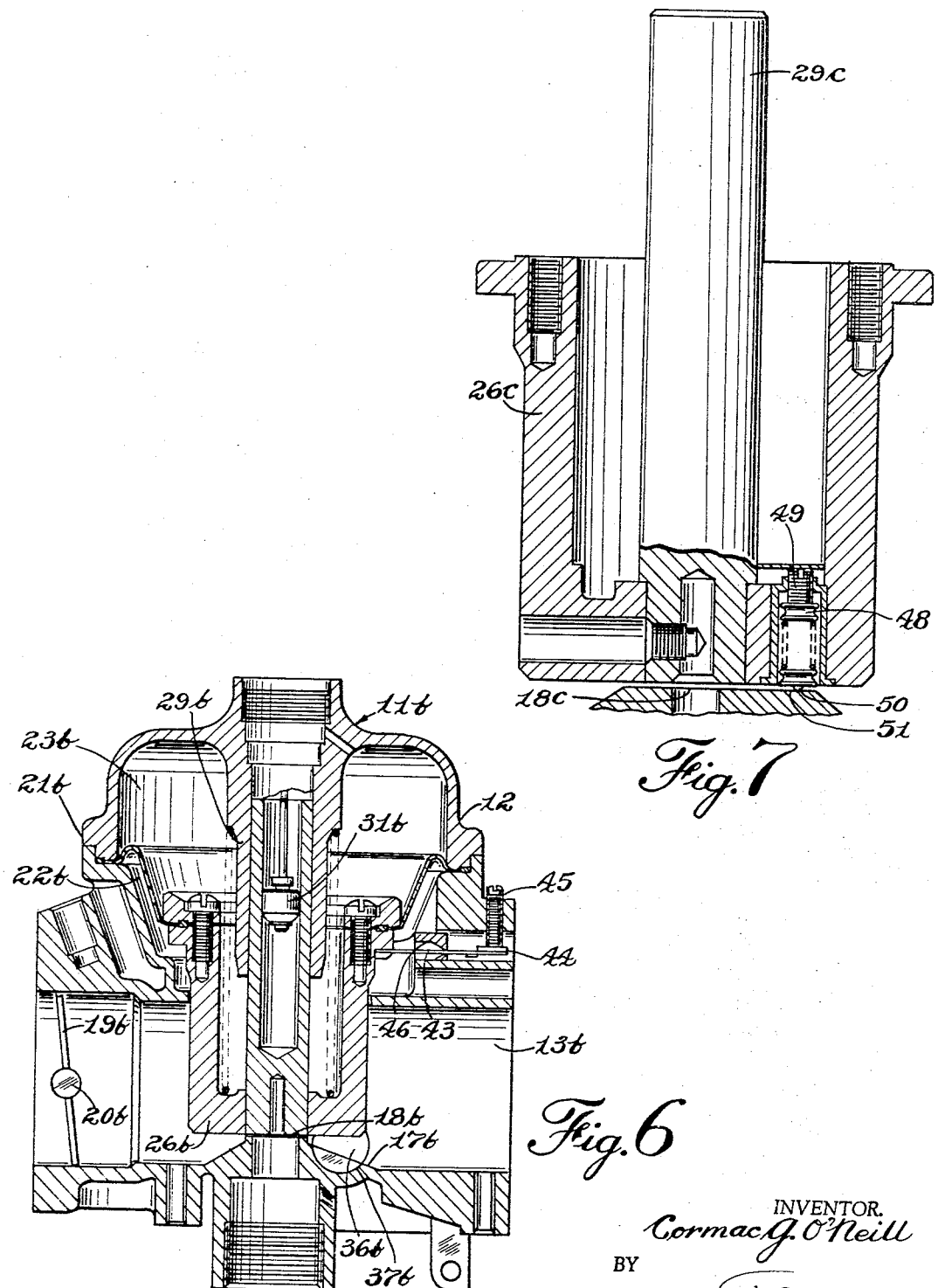

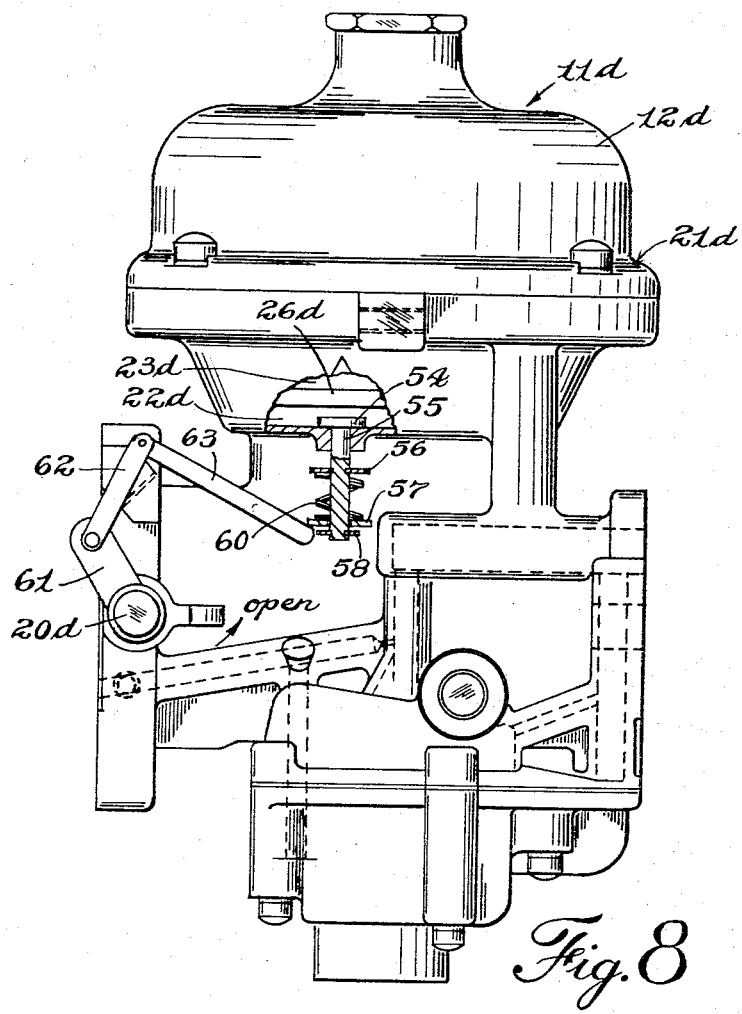

United States Patent Office 3,333,832
Patented Aug. 1, 1967

3,333,832
AIR VALVE CARBURETORS
Cormac Garrett O'Neill, Berkhamsted, England, assignor to The Bendix Corporation, a corporation of Delaware
Filed Apr. 11, 1966, Ser. No. 541,615
4 Claims. (Cl. 261—39)

The present invention relates to carburetors of the air valve type for internal combustion engines having a device responsive to fuel temperature changes induced by ambient temperature for controlling the fuel-air ratio of the mixture supplied by the carburetor to the engine.

Air valve carburetors include an induction passage with a throttle valve for controlling the amount of air-fuel mixture supplied to the engine, an air valve upstream of said throttle valve adapted to open responsive to the depression prevailing in a mixing chamber formed between said air valve and said throttle valve, and means operatively connected with said air valve for controlling a fuel passage opening into said mixing chamber. The air valve may be, for example, a piston, poppet or butterfly valve. One such air valve carburetor may include a device to maintain a substantially constant depression adjacent the fuel outlet. In the piston type air valve carburetors, the piston is mounted in a carburetor body and, in general, there is an air inlet duct opened to atmosphere. The piston is arranged to respond to the magnitude of depression existing adjacent the fuel outlet upstream of the throttle valve, the arrangement being such that approximately constant velocity flow is achieved across the fuel outlet. Arranged to project into the fuel metering jet or orifice is a tapered needle, carried by the piston and reciprocal therewith such that changes in the magnitude of the mass of air caused by opening and closing of the throttle valve results in changes in the size of the fuel orifice and thus, the amount of fuel supplied in order to maintain the desired air-fuel ratio.

Such carburetors supply a fuel-air mixture controlled by pressure and correction is not introduced for changes in fuel viscosity with temperature. One problem which exists with such carburetors is that ambient temperature increases result in a reduced viscosity of the metered fuel and consequent increases in the richness of mixture supplied by the carburetor which lead to rough running, particularly at idling speed.

The present invention sets out to reduce or eliminate this disadvantage which is apparent, especially under idling conditions at high temperatures without upsetting the normal action of the carburetor.

According to the present invention, there is provided a device for regulating the fuel-air mixture of an air valve carburetor which employs a fuel temperature or ambient temperature responsive device in association with the carburetor which modifies the response of the air valve depending upon the fuel temperature or the ambient air temperature.

According to a further aspect of the invention, there is provided an air valve type carburetor having a throttle valve and an air valve associated with a fuel jet orifice in which the opening or closing of the air valve is responsive to air flow past the air valve wherein a temperature responsive device is provided and associated with the carburetor to modify the response of the air valve in relation to changes of fuel temperature or ambient temperature over all or part of the range of air valve movement such that the desired fuel-air mixture is maintained for a given throttle setting. This may be achieved by associating the temperature responsive device directly or indirectly with the air valve.

Additional objects and advantages of the present invention will be apparent from the following description taken in conjunction with the accompanying drawings of embodiments of the invention in which:

FIGURE 6 is a fragmentary view of another modified form of the carburetor shown in FIGURE 1 having a temperature responsive spring controlled device;

FIGURE 7 is a fragmentary view of a further modified form of the air valve carburetor shown in FIGURE 1 having a temperature responsive bellows; and FIGURE 8 is a side elevational view of an air valve carburetor having a still further modification of a temperature responsive device.

Figure 1:
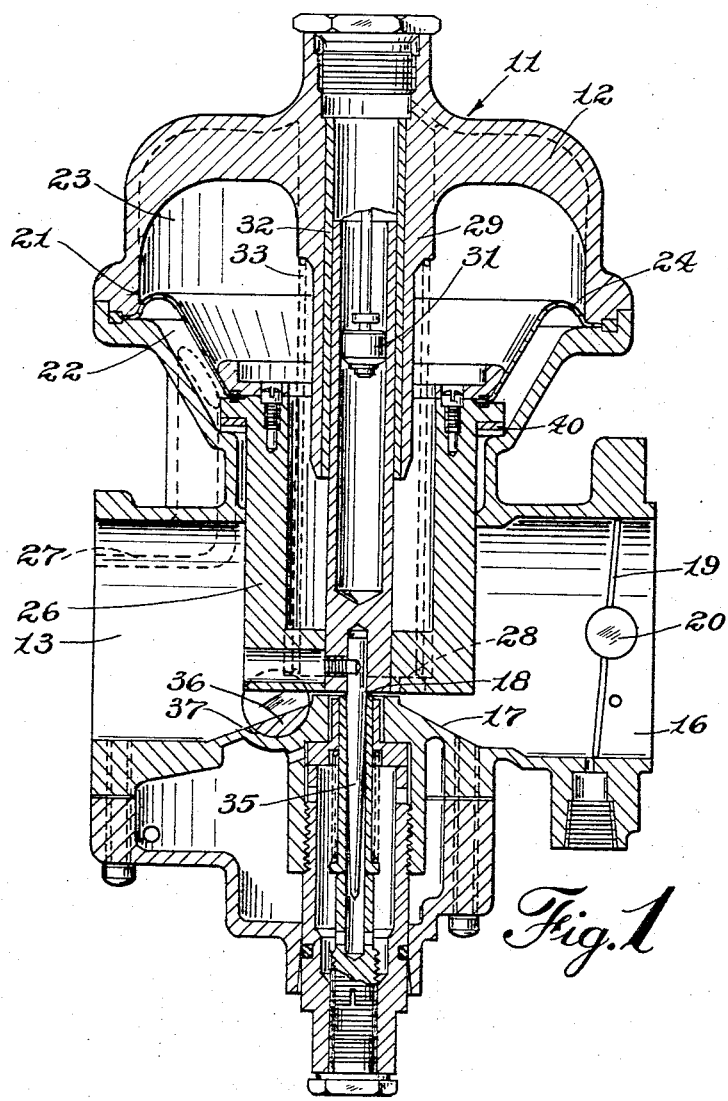
FIGURE 1 shows a side view, party in section and partly broken away, of one form of piston type air valve carburetor made in accordance with the present invention having a temperature controlled device constituted by an annular bimetal spring.

Turning now to FIGURE 1, the numeral 11 generally designates an air valve type carburetor having a body 12 with an induction passage 13 formed therein. The inlet extremity of the induction passage is adapted for connection to a source of air while the outlet extremity 16 of the induction passage is adapted for connection to the engine manifold (not shown). A bridge 17 is formed intermediate of the inlet and outlet extremities of the induction passage and has formed therein a fuel metering orifice, generally designated as 18. A throttle valve 19 for controlling the admission of the fuel-air mixture to the engine is rotatably supported in the passage adjacent to the induction passage outlet by a shaft 20.

The body 12 supports an air valve adjusting device which consists of a two part chamber, generally designated as 21. The lower part 22 and the upper part 23 of the chamber 21 are separated by a flexible diaphragm 24 and a reciprocal piston or air valve 26. The lower part or first chamber 22 is in communication with a source of air at a reference pressure, generally substantially atmospheric pressure. Air at the reference pressure is communicated to the chamber 22 by a conduit 27. The upper part or second chamber 23 is in communication with a source of air at sub-atmospheric pressure when the engine is operated by a conduit or orifice 28 opening between the hollow interior of the reciprocal piston and the induction passage intermediate of the needle valve 35 fixedly connected to the piston 26 and the throttle valve 19. The piston is guided in its movements by a support 29 depending from the top of the chamber 21 which houses therein a dash pot member 31 connected with a hollow sleeve member 32 of the choke piston. A calibrated spring 33 or the weight of the assembly normally biases the piston toward a closed position.

The needle valve 35 which is supported by the piston 26 is adapted to extend into the fuel orifice 18 for regulating the admission of fuel into the induction passage 13 in response to the mass of air passing to the choke area between the bottom of the choke piston 26 and the top of the bridge 17. Metering needle 35 and fuel orifice or jet 18 cooperate to control the effective area of fuel orifice exposure to pressure in the passage. When the throttle valve 19 is near a closed position, indicated by solid line, the choke piston will substantially close off the induction passage and little air will flow across the bridge.

When the throttle valve 19 assumes a wide open or full power position, as illustrated by dotted lines, the pressure differential in the air valve adjustment device 21 will cause the choke piston 26 to be retracted the maximum amount into the chamber 22, thereby allowing the greatest mass air flow to take place and the fuel orifice will be restricted by the needle valve to the least degree.

A contoured shaft 36 is fitted into a contoured periphery 37 in the bridge upstream of the needle valve 35 and the throttle valve 19 to act as a choke device or an enrichment device. This structure, shown and fully described in patent application No. 26,305/62, filed in the United Kingdom on July 9, 1962, Warren G. Kingsley, inventor, now Patent 1,011,151 issued Sept. 27, 1965, is able to function as an enriching or choke type of engine warm-up fuel-air-mixture control and may be used in conjunction with the present invention.

A temperature responsive device constituted by a bimetal spring 40 is arranged between the body 12 of the carburetor and the air valve 26 such that the response of the air valve 26 is "modified" in relation to changes in temperature which is in some known relationship to the temperature of the fuel flowing through the fuel orifice.

Figure 2:
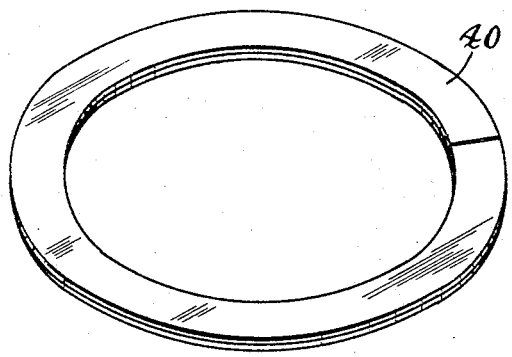
FIGURE 2 shows a perspective view of the annular bimetal spring shown in FIGURE 1 under cold conditions.
Figure 3:
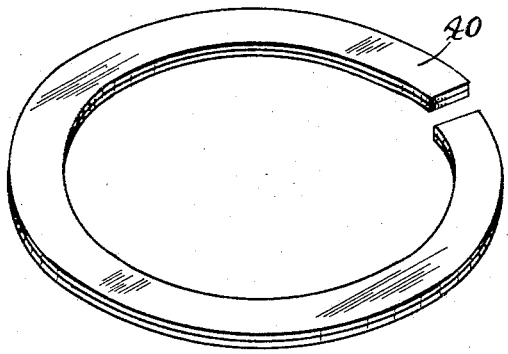
FIGURE 3 shows a perspective view of the annular bimetal spring shown in FIGURE 2 under hot conditions.

FIGURES 2 and 3 show the annular bimetal spring 40 of FIGURE 1 in further detail. In FIGURE 2, the spring is shown in the position it would normally adopt when cold and FIGURE 3 shows how the two ends separate axially from each other in response to increase in temperature. When cold, the ring 40 merely acts as a spacing washer between the body 12 of the carburetor and the air valve or piston 26. When hot, the annular temperature responsive bimetal spring 40 tends to deflect and imposes an upward force in opposition to downward force applied to the piston 26 by the spring 33 with the result that there is a greater upward movement of the reciprocal piston 26 than would otherwise be obtained, and consequently, a decrease in the magnitude of the depression or vacuum in the mixing chamber acting on the metering orifice 18, thus applying correction to maintain or vary the fuel-air ratio according to the ambient temperature. Although the changes in air valve 26 position increases fuel orifice area exposed to passage pressure, the air pressure change is the predominant effect. The design of the annular bimetal spring may be such that if the engine is stopped while hot, the piston 26 falls again to its lowermost position adjacent the bridge 17 since the upward force imposed by the annular bimetal spring will not be sufficient to overcome the downward force imposed by the spring 33 plus the piston weight. The design of the spring 33 may then be so arranged that lifting of the reciprocal piston 26 can occur only when a given magnitude of vacuum is reached in the upper chamber 23. If the air valve carburetor is as described above, the magnitude of vacuum able to cause lift of the piston 26 will be smaller when the ambient temperature is high than when the ambient temperature is low. With this arrangement, a high ambient temperature start is facilitated and correct high ambient temperature idling is achieved almost immediately.

In view of the similarity of figures shown, like parts will be indicated by the same numerals followed only by a letter without further explanation of the function of the parts.

Figures 4, 5:
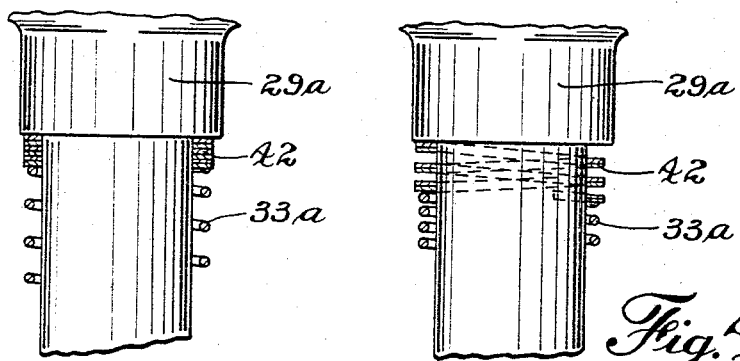
FIGURE 4 is a fragmentary view of a modified form shown in the cold running condition.
FIGURE 5 is a fragmentary view of the form, shown in FIGURE 4, shown in the hot running condition.

FIGURES 4 and 5 show a modified form of the invention and show the application of a three-coil temperature responsive bimetal spring 42 arranged around the piston support 29a. The upper spring seating of the support 29a may be modified slightly for the fitting of the three coil bimetal temperature responsive spring 42. The spring 42 is arranged so that as the ambient temperature increases, the force imposed by the spring on the air valve 26 is reduced so that the magnitude of depression necessary to cause lifting of the air valve 26 is reduced when the engine is hot. FIGURE 4 shows the three-coil bimetal spring 42 expanded under cold conditions between the preformed support 29a and the spring 33a. Under warm ambient temperature conditions, the spring 42 is arranged to shorten its axial length to take the position shown in FIGURE 5 where the three coils of the bimetal spring 42 are shown close coiled, and in consequence, the spring 33a is relieved of some preload.

Fuel viscosity and/or temperature is affected by ambient temperature surrounding the carburetor which in an automotive installation is the somewhat confined underhood temperature. In this region, ambient temperature is higher than outside ambient temperature, since the hot engine makes a contribution to the total heat. However, the disturbing effect which this invention seeks to overcome is the change in fuel viscosity occurring on a hot day which induces greater fuel vaporization and richness of the fuel air ratio, leading to rough engine running, particularly at idle. This problem is distinct from present day automatic choke devices which sense engine temperature during warm-up, usually for both cold and hot days to varying extents, but are non-functional after the engine has warmed up. Fuel temperature may, of course, be sensed directly by immersing a thermostat in a fuel float chamber, but such an arrangement is both unnecessary and complex. It is sufficient to locate a thermostat on or in the carburetor where it is subject to the same or related ambient temperature as the fuel. Care must be taken not to locate the thermostat near engine manifold or hot spots such as are intentionally sought out for automatic choke devices. Thus, in the embodiment shown of the present invention, ambient air temperature is sensed to supply the carburetor with the correction necessary to compensate for fuel viscosity changes as the temperature varies.

FIGURE 6 shows an air valve carburetor 11b of slightly different construction to that shown in FIGURE 1 and has a temperature responsive device in the form of a bimetal spring strip 43 pivotable intermediate its length between bevelled edges 46 and having one end located abutting the rim 34 of the reciprocal piston 26b so that deflection of this end of the bimetal spring 43 with increases in temperature result in the exertion of an upward force on the reciprocal piston or air valve 26b. Attached to the other end of the bimetal temperature responsive strip 43 is a reinforcement 44 adapted to be adjustably restrained from vertical movement by an adjustable stop 45; this permits external adjustment of the normal position of the temperature responsive bimetal spring 43.

FIGURE 7 shows a side fragmentary view of the air valve carburetor, shown in FIGURE 1, wherein a temperature responsive bellows 48 is fitted into the piston 26c. The air valve or piston 26c is fitted with a temperature responsive expandable bellows which is adjustably secured by a threaded member 49 to the variable choke piston 26c and has a free end which has an abutment 50 connected thereto. The free end of the bellows 48 moves downwardly with increasing temperature and acts upon an extending portion 51 of the bridge 17c. The bellows 48 contact the bridge extending portion 51 and impose by reaction an upward force on the reciprocal piston 26c. The movement of the expandable temperature responsive bellows 48 and the reciprocal air valve 26c is such that the reciprocal air valve feels the effect of the bellows only over a predetermined portion of piston lifts, usually designed for throttle settings around idle conditions.

Turning now to FIGURE 8, there is shown an air valve carburetor 11d which has a piston 55 with an abutment or engaging disc 54 fixed on the end which reaches through the body 12d and is adapted to raise and lower the variable choke piston 26d in response to fuel temperature and throttle plate position. The piston 55 is journalled through the body 12d. The upper engaging disc or abutment 54 is adapted to engage the reciprocal piston 26d. Intermediate of the end of the piston 55 is a fixed disc or washer 56 and near the end of the piston 55 is a disc or washer 57 which is slidable on the piston 55. A lock ring 58 is positioned on the piston 55 to prevent the washer or disc 57 from separating entirely from the piston 55. A temperature responsive bimetal spring 60 is fitted in between the discs 56 and 57 to raise and lower the disc or abutment 54 with respect to the ring 57. A lever arm 61 is rotatable with the throttle shaft 20d and has a linkage 62 interconnecting lever 61 and pivoted arm 63, which has an extending portion to engage the movable link or disc 57 to enable the fuel viscosity adjustment to correct for different throttle valve positions.

While it is obvious that the embodiments of the invention shown are operative to raise the air valve 26 and the needle 35 simultaneously with respect to the bridge 17, it is not obvious why the fuel richness is varied in accordance with this movement of the reciprocal choke valve 26 relative to the bridge 17. The explanation for the variance is that the air flow varies approximately as the square root of the pressure drop in the mixing chamber whereas the fuel flow varies as an intermediate factor between the pressure drop and the square root of the pressure drop. Consequently, if the pressure drop decreases, the fuel flow decreases more than the air flow and the richness of the mixture is decreased. The throttle valve 19, being maintained in a predetermined position, for example in the slow running position, if the ambient temperature increases, the ambient temperature responsive means causes the air valve and needle assembly to raise. This results in a decrease in the pressure drop in the mixing chamber and, consequently, in a decrease in the richness of the mixture which compensates for the increase in richness which would have occurred due to the decrease in the viscosity of the fuel if the air valve and needle assembly had not been raised. Thus, the fuel-air mixture ratio may be varied in accordance with the predetermined fuel-air schedule. In addition, substantially all of the air introduced to the engine has passed through the mixing chamber.

It can readily be appreciated that the present invention achieves its stated objects. In particular, it is especially effective to compensate for fuel viscosity changes as a function of fuel temperature. This temperature may, in fact, be sensed by determining an ambient temperature and modifying the position of the air valve 26 with respect to the fuel orifice 18 to compensate for fuel viscosity changes.

Although certain structures have been shown and described in detail in conjunction with the embodiments shown, it will be understood that changes may be made in the design and arrangement of parts without departing from the spirit of the present invention.

I claim:
1. In an air valve carburetor the combination of:
a body having a fuel-air induction passage;
a fuel orifice means disposed in the passage;
an air valve means mounted in the passage for reciprocal movement toward and away from the fuel orifice means;
a fuel metering needle member connected to the air valve means adapted to move reciprocally in the fuel orifice;
a throttle valve means in the passage downstream of the fuel orifice means for controlling the introduction of the fuel-air mixture to the engine; and
ambient temperature responsive means contactively abutting said air valve means for biasing said air valve means towards an open position under increasing temperature conditions to thereby decrease the fuel-air mixture ratio to correct for fuel viscosity changes.
2. The air valve carburetor claimed in claim 1 wherein:
the ambient temperature responsive means is a resilient member abutting said air valve means.
3. The air valve carburetor claimed in claim 1 wherein:
the temperature responsive means is operative to control the fuel-air mixture at low engine speeds.
4. The air valve carburetor claimed in claim 1 wherein:
the temperature responsive means operative to control the fuel-air mixture is responsive to throttle valve position.

References Cited
UNITED STATES PATENTS

| | | | |
|---|---|---|---|
| 1,197,152 | 9/1916 | Robbins | 261—39 |
| 1,288,296 | 12/1918 | Trane | 261—39 |
| 1,433,689 | 10/1922 | Morse et al. | 261—44 X |
| 1,664,718 | 4/1928 | Williams | 261—39 |
| 2,098,202 | 11/1937 | Weber | 261—50 |
| 2,583,406 | 1/1952 | Arnold | 261—50 |
| 3,210,055 | 10/1965 | Kingsley | 261—50 |
| 3,243,167 | 3/1966 | Winkler | 261—50 |

HARRY B. THORNTON, *Primary Examiner.*

FRANK W. LUTTER, *Examiner.*

T. R. MILES, *Assistant Examiner.*